SWITCHING SYSTEMS

Filed Oct. 30, 1958 2 Sheets-Sheet 1

BY

INVENTORS
WALTER F. KOSONOCKY &
LUBOMYR S. ONYSHKEVYCH

Morris A. Rabkin

ATTORNEY

INVENTORS
WALTER F. KOSONOCKY &
LUBOMYR S. ONYSHKEVYCH
BY Morris A. Rabkin
ATTORNEY

United States Patent Office 3,084,264
Patented Apr. 2, 1963

3,084,264

SWITCHING SYSTEMS

Walter F. Kosonocky, Newark, and Lubomyr S. Onyshkevych, Princeton, N.J., assignors to Radio Corporation of America, a corporation of Delaware Filed Oct. 30, 1958, Ser. No. 770,830
5 Claims. (Cl. 307—88)

This invention relates to switching systems, and particularly to switching systems using non-linear reactance elements.

It is known that parametric oscillations can be established in a resonant circuit using a non-linear reactance. This non-linear reactance may be magnetic, such as a ferromagnetic core, or may be capacitive such as a ferroelectric condenser, a variable capacity diode, and so on. Circuit oscillations occur in either one of two distinct phases. Thus, the circuit is a bistable circuit with respect to the phase of oscillations. The two phases are used to represent the two binary information signals "1" and "0."

In many applications, it is desirable to provide a bistable circuit that can be simply and reliably changed from one stable state to the other each time an input signal is received. For example, in scaling and counting circuits, in triggerable flip-flop circuits, in complementing circuits, and in logic "in" circuits, and so on. Each input signal causes the circuit to reverse its present state.

An object of the present invention is to provide improved storage systems using parametric oscillator circuits.

Another object of the present invention is to provide improved bistable circuits which are triggerable from one stable state to the other stable state in a simple and reliable manner.

A further object of the present invention is to provide improved methods of and apparatus for switching the phase of oscillations and parametric circuits.

Still another object of the present invention is to provide novel methods of and apparatus for changing the phase of a parametric oscillator circuit.

According to the present invention, the parametric oscillator circuit operates at a fixed multiple which term, as used herein, includes sub-multiples and the fundamental of the A.C. supply frequency and in one of the two phases. The natural frequency of the resonant circuit is somewhat different from the multiple frequency. By suitably modulating the A.C. (alternating current) supply signals, the frequency of the circuit oscillations changes from the fixed frequency towards the natural frequency of the resonant circuit. This natural frequency is determined by the physical parameters of the reactance elements used in the circuit, and in practice, is different from the multiple frequency fixed by the A.C. supply. Thus, depending upon the length of the modulation interval, the oscillations in the resonant circuit gain or lose an even or an odd number of half cycles with respect to the parametric oscillation frequency. These resonant circuit oscillations effectively function in the same manner as the externally applied control signals of the prior art circuits. Thus, if the resonant circuit has gained (or lost) an odd number of half cycles, the parametric oscillations are restarted in the phase opposite the one phase. If the resonant circuit has gained (or lost) an even number of half cycles, the parametric oscillations are restarted in the same one phase.

Figure 1:
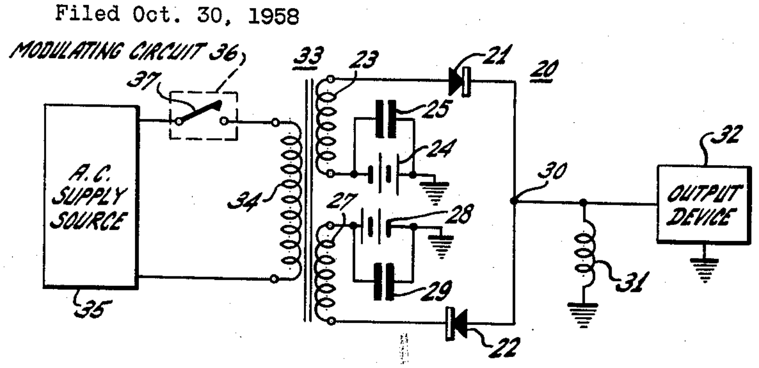
FIGS. 1 and 2 are, respectively, schematic diagrams of two different forms of parametric oscillator circuits useful in the present invention.

Parametric oscillator circuits frequently use a pair of non-linear reactance devices connected in a balanced tuned circuit relation with a linear reactance element. The pair of devices operate to balance out the A.C. supply signals from the circuit output. The non-linear reactances may be a pair of magnetic cores or as shown in FIG. 1, a pair of variable capacity diodes 21 and 22. The diodes 21 and 22 may be junction diodes which exhibit a variable capacity when biased in the reverse direction. The diode 21 has its anode connected in series with a first A.C. supply winding 23 to a reverse bias source such as a battery 24. The positive terminal of the battery 24 is connected to a common point of reference potential indicated in the drawing by the conventional ground symbol. A bypass capacitor 25 conveniently is connected across the terminals of the battery 24 to prevent transient signals from affecting the bias point of the diode 21. The cathode of the diode 22 is connected in series with a second A.C. supply winding 27 to the positive terminal of a reverse bias source shown as a battery 28. The negative terminal of the battery 28 is connected to ground. A separate bypass capacitor 29 is connected across the terminal of battery 28. The cathode of the diode 21 and the anode of the diode 22 are each connected to a common junction point 30.

The linear reactance in the circuit of FIG. 1 is provided by an inductor 31 having one terminal connected to the common junction 30 and the other terminal connected to ground. An output device 32 is connected across the inductor 31. A.C. signals are applied to the oscillator circuit by means of a transformer 33 having the first and second A.C. supply windings 23 and 27 as its secondary windings and having a primary winding 34 connected to the outputs of an A.C. supply source 35. A modulating circuit 36 is connected between the A.C. supply source 35 and the primary winding 34 of the transformer 33 to modulate the A.C. supply signals in a desired fashion. The modulator circuit 36 may be one capable of modulating the amplitude of the A.C. supply by 100% such as the single-pole, single-throw switch 37. Other known types of amplitude modulating circuits may be used.

Figure 2:
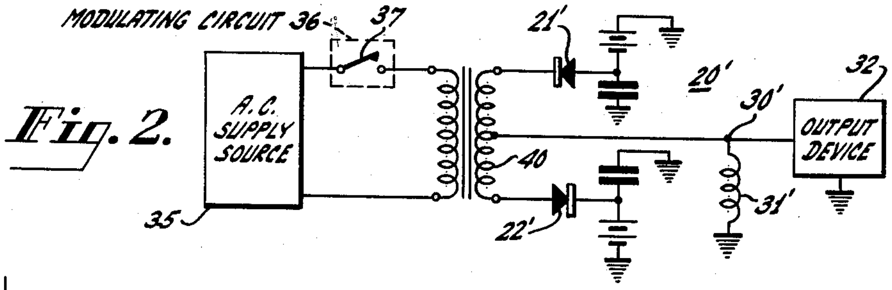

Another form of oscillator circuit 20′ using variable capacity diodes is shown in FIG. 2. The circuit 20′ is similar to the circuit 20 of FIG. 1 except that the pair of A.C. signal windings 23, 25 of FIG. 1 are combined in a single center-tapped secondary winding 40. The diode 21′ is connected to one terminal of the secondary winding 40 and the diode 22′ is connected to the other end terminal of the secondary winding 40. The center tap of the secondary winding 40 is connected to the common junction point 30′.

In operation, application of A.C. supply signals of sufficient amplitude to the circuit 20 causes the circuit 20 to begin oscillating parametrically at a multiple of the supply frequency and in either one or the other of two opposite phases. When variable capacity diodes are used, the second subharmonic of the A.C. supply frequency is used because the energy conversion between the supply and the output circuits is most efficient at this frequency.

Normally in the absence of an additional control signal, the phase in which the circuit 20 oscillates is undefined. That is, the phase of a random noise signal occurring at the start of the build-up of the parametric oscillations determines the phase of the circuit oscillations. In the prior art circuits, an additional control signal at the subharmonic frequency and of the desired phase is coupled to the circuit 20. The amplitude of the control signal is made larger than that of the random noise. This control signal insures that the parametric oscillations occur in the desired phase.

Figure 4:
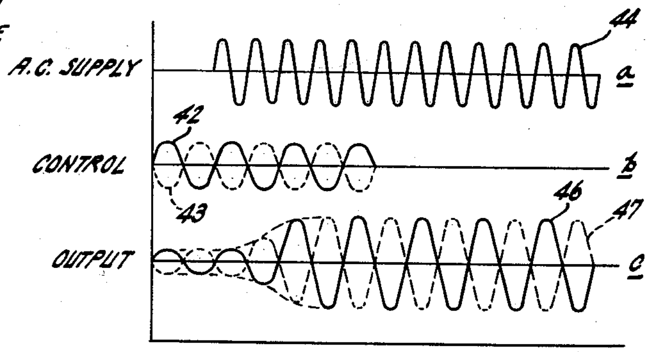
FIG. 4 is a timing diagram of waveforms useful in explaining the operation of the system of FIG. 1.

The waveforms of lines *a*, *b*, and *c* of FIG. 4 represent the A.C. supply signal of frequency ($2f$), the control signals of the subharmonic frequency ($f$), and the output signals at the frequency ($f$). The control signals are applied in either one or the other of the two phases represented, respectively, by the solid curve 42 and the dotted curve 43 of line *b*. The control signals are also applied at a time just prior to the application of A.C. signals represented by the solid curve 44 of line *a*. In the absence of A.C. supply signals, relatively little or no output signal is produced by the circuit 20. When the A.C. signals are first applied, the oscillations begin to build up exponentially in the same phase as the previously applied control signals, as represented by the solid curve 46 and the dotted curve 47 of line *c*. After the oscillations have reached a maximum amplitude, the control signals may be removed and the circuit will continue to operate in the set phase.

When it is desired to change the phase of the oscillations of the circuit 20, the A.C. supply signals are first removed, a new control signal in the desired phase is then applied, and finally, the A.C. signals are again applied with the circuit oscillating in the new phase.

Other methods of reversing the phase of the circuit oscillations include applying two relatively large amplitude control signals of the desired phase. These two signals together cause the circuit oscillations to die out and then begin again in the desired phase. Still another method is to reduce the amplitude of the A.C. supply signals and apply an additional control signal of suitable amplitude. This additional control signal together with the reduced amplitude supply signals forces the oscillator circuit to assume the desired phase. Thus, in each of the prior art circuits, the changing of the phase of the oscillator circuit involves the application of one or more externally applied control signals.

Figure 3:
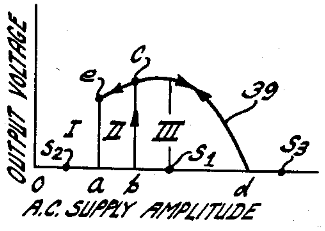
FIG. 3 is a graph of the response characteristics of the circuits of FIGS. 1 and 2 as a function of A.C. supply amplitude.

The response curve 39 of FIG. 3 represents the oscillator output voltage as a function of A.C. supply voltage amplitude. As shown by the curve 39, the parametric oscillator circuit exhibits three distinct response regions, designated I, II, and III, with increasing supply amplitude. In taking the curve 39, the supply frequency is fixed, as is the circuit 20 tuning. In region I, between the points *o* and *a*, the circuit is not oscillating and substantially no output voltage is produced. As the A.C. supply increases from the point *a* to the point *b* circuit suddenly jumps into oscillation at the point *b* and the output voltage rises sharply to a value indicated by the point *c* of the curve 39. As the supply voltage increases from the point *b* to the point *d* in the region III, the circuit continues oscillations until the point *d* is reached. For supply amplitudes in excess of that corresponding to the point *d*, the circuit can no longer sustain the parametric oscillations and the output voltage remains substantially at "0" value. When the supply amplitude decreases from the point *d*, the circuit continues operating in the region III and in the region II until the point *e* is reached. At the point *e* of the curve 39, the circuit ceases oscillation and the output voltage sharply decreases to "0" value. Thus, the region II, between the points *a*, *b*, *c*, *e*, is one having a hysteresis effect. Observe, however, that the circuit can only oscillate for ranges of the supply voltage amplitude between the points *a* and *d* along the abscissa. If the supply voltage amplitude is made lower than that corresponding to the point *a*, say that indicated by the point S2, the circuit ceases oscillation if it were previously oscillating or does not begin oscillating if it were previously not oscillating. Similarly, for supply voltage amplitude in excess of the value *d* represented by the point S3 along abscissa, the circuit, if it were previously oscillating, ceases oscillation. Normally, the supply voltage amplitude is maintained at a value corresponding to the point S1 of which a maximum output voltage is obtained with the circuit response being in the region III of the characteristic.

Figure 5:
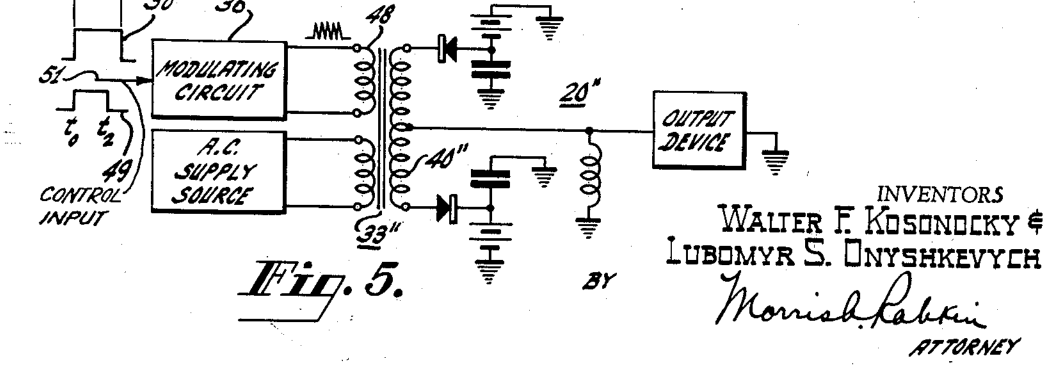
FIG. 5 is a schematic diagram of a parametric oscillator circuit according to the invention using a pulsed A.C. modulation source.

The oscillator circuit 20″ of FIG. 5 is the same as the oscillator circuit 20′ of FIG. 2 except that a different modulation source 36′ is used. The modulation source 36′ may be any suitable source arranged to apply a burst of alternating current signals in the frequency $2f$ to the oscillator circuit 20″. The output of the oscillator circuit 36′ is transformer coupled to the secondary winding 40″ by means of an additional primary winding 48 of the transformer 33″. The modulation source 36′, for example, may be another parametric oscillator circuit arranged to apply a burst of output pulses of either one or the other of the two phases and at the supply frequency ($2f$) to the primary winding 48. If the burst of modulation output pulses is in the one phase, the net A.C. supply of the oscillator circuit 20″ is changed from the point represented by S1 of FIG. 3 to that represented by the point S3. Accordingly, the circuit 20″ stops oscillating for the duration of the burst of output pulses from the modulator 36′. If the burst of output pulses from the modulation source 36′ is of the other phase, the net A.C. supply applied to the oscillator 20″ changes from the point represented by S1 in FIG. 3 to the point represented by S2 of FIG. 3. Again, the circuit 20″ ceases operating parametrically for the duration of the modulation burst. The duration of the modulation burst is controlled by two control pulses 49, 50 applied to a control input 51 of the modulation source 36′. The first control pulse 49 is applied between a time $t_0$ and a later time $t_2$. The second control pulse 50 is applied between the time $t_0$ and the time $t_3$ with the second control pulse being of relatively longer duration. The reason for the different duration control pulses 49 and 50 is described more fully hereinafter in connection with FIGS. 6 and 7. The modulation source 36′ may be a parametric oscillator burst generator as described, for example, in our copending application, Serial No. 765,876, filed October 7, 1958, entitled Switching Systems.

Figure 6:
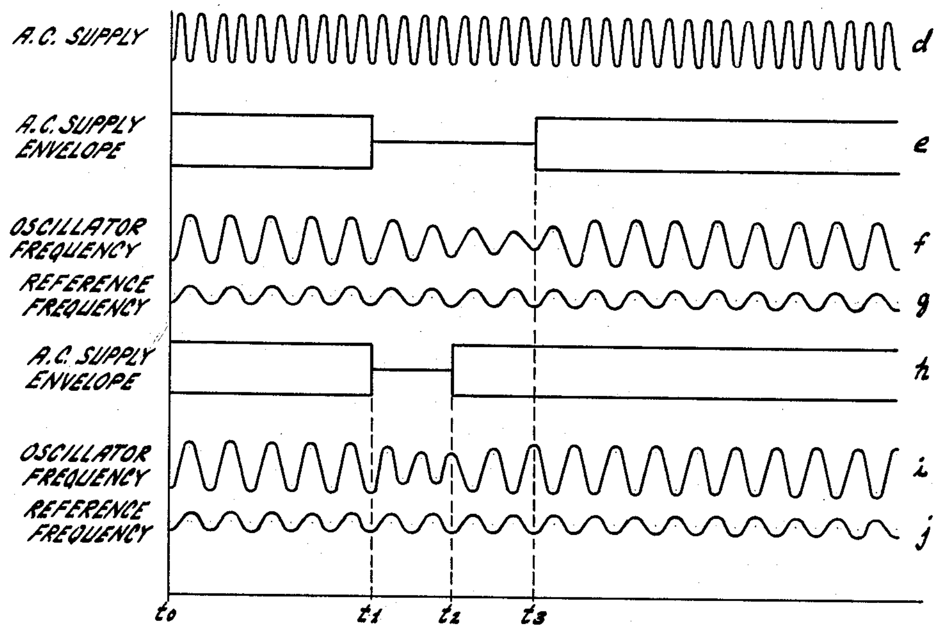
FIG. 6 is another timing diagram further explaining the operation of the circuits of FIGS. 1 and 2 according to the present invention.

In FIG. 6, the waveforms of lines *d*, *e*, *f*, *g*, *h*, *i* and *j* represent the selective switching of the phase of a parametric oscillator circuit using the modulating circuit 36 of FIGS. 1 and 2. The A.C. supply waveform is shown in line *d* of FIG. 6. In lines *e* and *h*, there is shown the envelope of the A.C. supply waveform amplitude modulated 100% by the modulating circuit 36. Lines *f* and *i*, respectively, represent output waveforms in which the phase of the circuit oscillations is and is not changed due to the supply modulations. The waveforms of lines *g* and *j* of FIG. 6 are reference waveforms at the output frequency ($f$), and are used as an aid in illustrating the switching of the phase of the output waveforms of lines *f* and *i*.

Considering now, lines *e*, *f*, and *g* of FIG. 6 assume that at time $t_0$, the A.C. signals are applied as by closing the switch 37 of the modulating circuit 36. Also assume that the oscillator circuit 20 is operating in the same phase as the reference waveform of line *g*. At time $t_1$, the switch 37 of the modulator circuit 36 is opened, and at the later time $t_3$, the switch 37 is again closed. At the time $t_1$ when the switch 37 is opened, the oscillations in the circuit 20 begin to die out exponentially due to the absence of the A.C. supply. Also, the oscillation frequency starts to change towards the natural frequency of the tuned circuit. In practice, the natural frequency is made slightly higher than the parametric oscillating frequency. Thus, for example, the oscillator 20 may be set for parametric oscillations at two megacycles using a four megacycle A.C. supply source 35, and the oscillator circuit natural frequency of 2.8 megacycles. In such case, between the times $t_1$ and $t_3$, the oscillation frequency of the circuit 20 begins to increase towards the natural frequency. Thus, as a function of time, the phase of the oscillator output, line *f*, begins to lead the phase of the reference waveform, line *g*. The time interval $t_1$–$t_3$ is chosen such that the oscillator phase leads the reference phase by approximately 360°, or by two half cycles. Thus, at the time $t_3$ the oscillator output waveform is again in phase with the reference waveform of line *g*. Now at the time $t_3$, when the A.C. supply is again applied as by closing the switch 37, the oscillator begins to oscillate parametrically in the same phase as the reference waveform. Accordingly, when an even number of half-cycles of the parametric oscillation frequency are gained or lost during the modulation time interval, parametric oscillations begin again in the initial phase. In digital terms, this corresponds to the same information being stored in the oscillator 20 both before and after the modulation interval.

Now, referring to lines *h*, *i* and *j* of FIG. 6, the circuit waveforms are shown for a modulating interval between the times $t_1$ and $t_2$, the time interval $t_1$–$t_2$ being shorter than the time interval $t_1$–$t_3$. As shown in lines *i* and *j* of FIG. 6, the phase of oscillations of the circuit 20 gains 180° or one-half cycle over the reference waveforms. Accordingly, at the time $t_2$, when the A.C. signals are again applied, as by closing the switch 37, the parametric oscillations build up in the opposite phase from the initial phase. Thus, when the A.C. supply source is modulated so that the resonant circuit oscillations gain (or lose) an odd number of half-cycles, the phase of the parametric oscillations reverse. In digital terms, this corresponds to the information previously stored in the oscillator 20 being "complemented." That is a binary "1" is changed to a binary "0," and vice versa.

Figure 7:
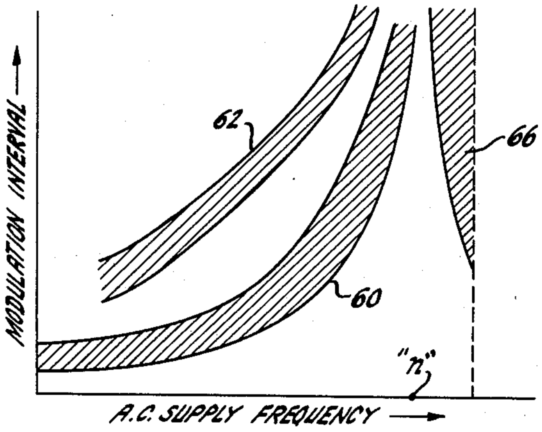
FIG. 7 is a graph of curves showing the circuit switching time as a function of A.C. supply frequency.

The curves of FIG. 7 represent a plot of the A.C. supply frequency vs. the modulation time. The two shaded areas 60, 62 of FIG. 7 represent the reversal of of phase of the parametric oscillations due to the gaining of one-half and three halves cycles respectively during the modulation interval. Other shaded areas above the area 62 occur for gains of five-halves, seven-halves cycles, and so on. The shaded area 66, at the extreme right of FIG. 7, represents the reversal of phase of the parametric oscillations due to the losing of an odd number of half-cycles during the modulation interval. The unshaded areas of FIG. 7, between the abscissa and the shaded areas 60 and 66, represent the regions in which no or an even number of half-cycles are gained or lost during the modulation interval. The area between the abscissa and and the shaded area 60 represents the gain of less than a half cycle; and the area between the shaded curves 60 and 62 represents the gain of two half-cycles. The point "*n*" along the abscissa corresponds to the value of A.C. supply frequency at which the parametric oscillation frequency and the natural frequency of the circuit 20 are equal. Thus, for values of A.C. supply of frequency "*n*" the circuit 20 continues to oscillate at the same frequency even during the modulation interval. Thus, no phase changes occur and no phase reversal is possible at the A.C. supply frequency "*n*."

For A.C. supply frequencies producing parametric oscillations below the natural frequency "*n*," the circuit oscillations gain in phase during the modulation interval. For A.C. supply frequencies producing parametric oscillations above the natural frequency "*n*" the circuit oscillations lag in phase during the modulation interval. However, a cut-off region, indicated by the dotted line, occurs slightly above the natural frequency "*n*" when the A.C. supply frequency is too high to sustain parametric oscillations. The shaded region 66 is bounded on the extreme right by this cut-off region. Each of the regions is bounded by an upper and a lower curved line. For the shaded regions, the lower curved line represents the condition when the circuit oscillations have gained say slightly more than 90°, and the upper curved line represents the condition when the circuit oscillations have gained slightly less than 270°. Recall that the parametric oscillations can occur only in the two phases and the circuit will lock into the one of these two phases which is nearest to the control signal. In the present invention, the phase control is provided by the damped oscillations occurring in the tuned circuit during the modulation interval. The conditions when the circuit oscillations have gained exactly 90° or exactly 270° are conditions of uncertainty where the parametric oscillations could restart in either one or the other of the two phases. This means that the modulation interval is not critical and any interval during which a phase gain of say 110° to 260° occurs can be used. Thus, if the modulation interval is set to cause a gain of 180°, a tolerance of 70° is permitted without unduly affecting circuit operation. Similarly, a wide tolerance is permitted in the other modulation interval when it is not desired to change the phase of the oscillations, as indicated by the unshaded area between the shaded areas 60 and 62.

Observe also that the tolerance of the modulation interval increases as the parametric oscillation frequency approaches the natural frequency of the tuned circuit. The different ordinate value between the two extremes of a region becomes smaller as the A.C. supply is reduced a frequency. Below the bottom portion of the region 60, the modulation interval is of insufficient duration to permit the circuit oscillations to gain an appreciable portion of a half-cycle with respect to the reference frequency. Accordingly, the circuit oscillation always restarts in the same phase when the A.C. signals are reapplied.

Between the lower region 60 and the upper region 62, the circuit gains a full cycle and resumes operation in the same phase when the A.C. signals are reapplied.

The width of the upper shaded region 62 is narrower than the width of the lower shaded region 60, since in the upper region 62 the circuit is gaining three half-cycles.

There have been described herein novel parametric oscillator switching systems in which an oscillator either switches or not from a standard phase depending upon the time of interruptions of the A.C. supply signals. The switching is unconditional, that is, the oscillator always begins oscillating in a desired one of the two phases controlled by the interruptions of the supply signals. This switching feature may be incorporated in various known switching and memory systems in place of the additional control signal of the prior art circuit. For example, in memory systems using parametric oscillator circuits, the information may be read out of an oscillator circuit using the method of the present invention to insure that no stored information is lost during the read-out process.

What is claimed is:

1. A system comprising a parametric oscillator circuit having a natural resonant frequency, said circuit having different phases of oscillation respectively corresponding to different information signals, said circuit oscillating at a fixed multiple of an A.C. supply frequency only when said A.C. supply signals of an amplitude within a given range are applied to said circuit, a modulating means connected to said circuit, and means for storing a desired information signal in said circuit including means for operating said modulating means to modulate said A.C. supply signals to an amplitude outside said given range for a given time interval, said circuit resuming oscillations in one or the other of said phases in accordance with the duration of said given time interval.

2. A system comprising a parametric oscillator circuit having a natural resonant frequency, said circuit representing the two binary digits by two different phases of oscillation at one frequency which is a fixed multiple of an A.C. supply frequency and which different from said resonant frequency, said circuit oscillating at said one frequency when A.C. supply signals are applied, a modulating means connected to said circuit and means for operating said modulating means to effectively cause said A.C. supply signals to change from an on condition to an off condition for a given time interval, said circuit operating at a frequency different from said one frequency during said off condition, and said circuit resuming oscillation in one or the other of said two phases in accordance with the length of said given time interval.

3. A system comprising a parametric oscillator circuit having a natural resonant frequency, the two binary digits being represented respectively by two phases of oscillation of said circuit, means for coupling A.C. supply signals to said circuit, a modulating means coupled with said A.C. supply signals to said circuit, and means for operating said modulating means to modulate said A.C. supply signals for a given time interval to change the phase of oscillation of said circuit from one to the other of said two phases, said circuit resuming oscillation in one or the other of said two phases in accordance with the duration of said given time interval.

4. In a switching system, the combination of a parametric oscillator circuit having a natural resonant frequency and having two distinct phases of oscillation at another frequency when A.C. supply signals are applied to said circuit, said other frequency being a fixed multiple of said supply frequency and being different from said resonant frequency with modulating means for interrupting said other frequency oscillations for a given time interval, said circuit resuming oscillations in one or the other of said two phases depending upon the length of said given time interval.

5. A system comprising a parametric oscillator circuit having a natural resonant frequency, the two binary digits being represented by two distinct phases of oscillation at another frequency which is a fixed multiple of an A.C. supply frequency and which is different from said resonant frequency, means for applying said A.C. signals to said circuit, and means for applying momentarily to said circuit modulating signals at the frequency of and in a direction to cancel said A.C. signals, said circuit changing or not changing from one to the other of said two phases depending on the duration of said modulating signals.

References Cited in the file of this patent

UNITED STATES PATENTS 2,815,488 Von Newmann ........... Dec. 3, 1957

FOREIGN PATENTS 778,883 Great Britain ........... July 10, 1957

OTHER REFERENCES

Article by Turner in "Radio-Electronics," May 1958, pp. 57–59.